(12) United States Patent
Hahnlen et al.

(10) Patent No.: US 12,157,515 B2
(45) Date of Patent: Dec. 3, 2024

(54) SOLID-STATE REINFORCED DOOR RING

(71) Applicant: Honda Motor Co., Ltd., Tokyo (JP)

(72) Inventors: Ryan M. Hahnlen, Dublin, OH (US); Hongqi Guo, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 17/707,141

(22) Filed: Mar. 29, 2022

(65) Prior Publication Data

US 2023/0312006 A1    Oct. 5, 2023

(51) Int. Cl.
| | |
|---|---|
| *B62D 25/02* | (2006.01) |
| *B33Y 80/00* | (2015.01) |
| *B62D 25/04* | (2006.01) |
| *B62D 25/06* | (2006.01) |
| *B62D 27/02* | (2006.01) |
| *B23K 20/10* | (2006.01) |
| *B33Y 10/00* | (2015.01) |

(52) U.S. Cl.
CPC .............. *B62D 25/04* (2013.01); *B33Y 80/00* (2014.12); *B62D 25/025* (2013.01); *B62D 25/06* (2013.01); *B62D 27/023* (2013.01); *B23K 20/10* (2013.01); *B33Y 10/00* (2014.12)

(58) Field of Classification Search
CPC ...... B62D 25/04; B62D 25/025; B62D 25/06; B62D 27/02; B62D 27/023
USPC ......... 296/209, 193.06, 201, 23.01, 3, 29, 30
See application file for complete search history.

(56) References Cited

U.S. PATENT DOCUMENTS

| | | | | |
|---|---|---|---|---|
| 2,209,285 | A | * | 7/1940 | Oile ....................... B62D 23/00 49/378 |
| 6,282,790 | B1 | * | 9/2001 | Jaekel .................. B62D 23/005 296/205 |
| 6,578,909 | B1 | * | 6/2003 | Reed ....................... B62D 25/04 296/210 |
| 7,396,072 | B2 | | 7/2008 | Fischer et al. |
| 8,662,575 | B2 | * | 3/2014 | Tamura .................. B62D 25/04 296/209 |
| 9,132,859 | B2 | | 9/2015 | Yamaji et al. |
| 10,974,766 | B2 | * | 4/2021 | Sakata .............. B62D 25/2036 |
| 11,351,590 | B2 | * | 6/2022 | Hahnlen ................ B21D 22/02 |
| 2014/0193659 | A1 | | 7/2014 | Lanzerath et al. |
| 2015/0314363 | A1 | | 11/2015 | Nelson et al. |
| 2018/0354014 | A1 | | 12/2018 | Maux et al. |

(Continued)

FOREIGN PATENT DOCUMENTS

| | | | | | |
|---|---|---|---|---|---|
| CN | 1081146 | C | * | 3/2002 | ............. B62D 21/07 |
| JP | 2018118573 | A | * | 8/2018 | ............. B62D 25/20 |
| WO | 2014016079 | A1 | | 1/2014 | |

OTHER PUBLICATIONS

Text CN1081146 (Year: 2002).*

(Continued)

*Primary Examiner* — Dennis H Pedder
(74) *Attorney, Agent, or Firm* — Morgan Lincoln; American Honda Motor Co., Inc.

(57) ABSTRACT

A door ring assembly is provided. The door ring assembly includes a frame member that includes a reinforcement. The reinforcement is solid-state bonded to the frame member. The frame member further includes a body and a first leg. The first leg extends outward from the body. Further, the first leg intersects with the body to form a corner radius, and the reinforcement is positioned on at least a portion of the corner radius.

18 Claims, 8 Drawing Sheets

(56) References Cited

U.S. PATENT DOCUMENTS

2019/0022957 A1  1/2019  Knaupp et al.
2019/0047031 A1  2/2019  Hahnlen et al.
2022/0371091 A1* 11/2022 Weyrauch ............ B23K 26/342

OTHER PUBLICATIONS

Text JP 1018118573 (Year: 2018).*
"Ultrasonic welding increases strength." Automotive News. Aug. 23, 2004. https://www.autonews.com/article/20040823/SUB/408230801/ultrasonic-welding-increases-strength.

* cited by examiner

SOLID-STATE REINFORCED DOOR RING

BACKGROUND

Vehicles may generally include frame members (such as side sills) that may be designed to minimize deformation of the vehicles, in an event of a vehicle collision. Based on the vehicle collision, such frame members may form an impact load path along the vehicle, such that there may be a minimal deformation into an occupant space of the vehicle. However, in certain cases, the frame members may form a limited load path based on structural constraints (such as a material thickness) of the frame members and based on a cost to manufacture such frame members with such structural constraints.

In an example, the frame members may be configured to form the impact load path based on a structural configuration, such as a variation in the material thickness of the frame members in areas that may be adjacent to the occupant space. The variation in the material thickness may increase the sheet metal thickness of the frame members. In some cases, the increased sheet metal thickness may subsequently increase a vehicle mass, which may lead to a minimal dynamic performance and may further impact fuel economy of the vehicle. In other cases, the increased sheet metal thickness may also increase an amount of raw materials that may be required to manufacture the frame members with such increased sheet metal thickness. Therefore, based on the increased amount of raw materials, there may be a significant increase in a cost to manufacture the frame members.

In another example, the frame members may be configured to form the impact load path based on a number of reinforcement pieces (such as stamped sheet metal pieces) that may be joined to the frame members, to locally increase a strength and a stiffness of the vehicles. In certain cases, the number of reinforcement pieces may be joined with the frame members based on an additional process (such as brazing, spot welding, etc.) that may use additional consumable materials (such as a filler material, fluxes, or shielding gases), which may eventually increase the cost to manufacture such frame members of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a door ring assembly. The door ring assembly may include a frame member that may include a reinforcement, which may be solid-state bonded to the frame member. The frame member may include a body and a first leg. The first leg may extend outward from the body. Further, the first leg may intersect with the body to form a corner radius. The reinforcement may be positioned on at least a portion of the corner radius.

Another exemplary aspect of the disclosure provides a door ring assembly. The door ring assembly may include an A-pillar that may have an upper portion and a lower portion. The door ring assembly may further include a B-pillar that may have an upper portion and a lower portion. The door ring assembly may further include a stamped side sill assembly that may be formed from a blank that may include a reinforcement that is solid state bonded to the blank. The stamped side sill assembly may include a body that may have a first length, which may extend from a first end of the body to a second end of the body. The first end may be secured to the lower portion of the A-pillar. The second end may be secured to the lower portion of the B-pillar. The reinforcement may be positioned longitudinally along the first length of the body, based on a location of the upper portion of the A-pillar.

Another exemplary aspect of the disclosure provides a door ring assembly. The door ring assembly may include an A-pillar formed from a blank, which may include a reinforcement that may be solid state bonded to the blank. The A-pillar may have an opening. The opening may have a perimeter that may extend from a third end of the opening to a fourth end of the opening. The reinforcement may be positioned along at least a portion of the perimeter of the opening in the A-pillar.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1A:
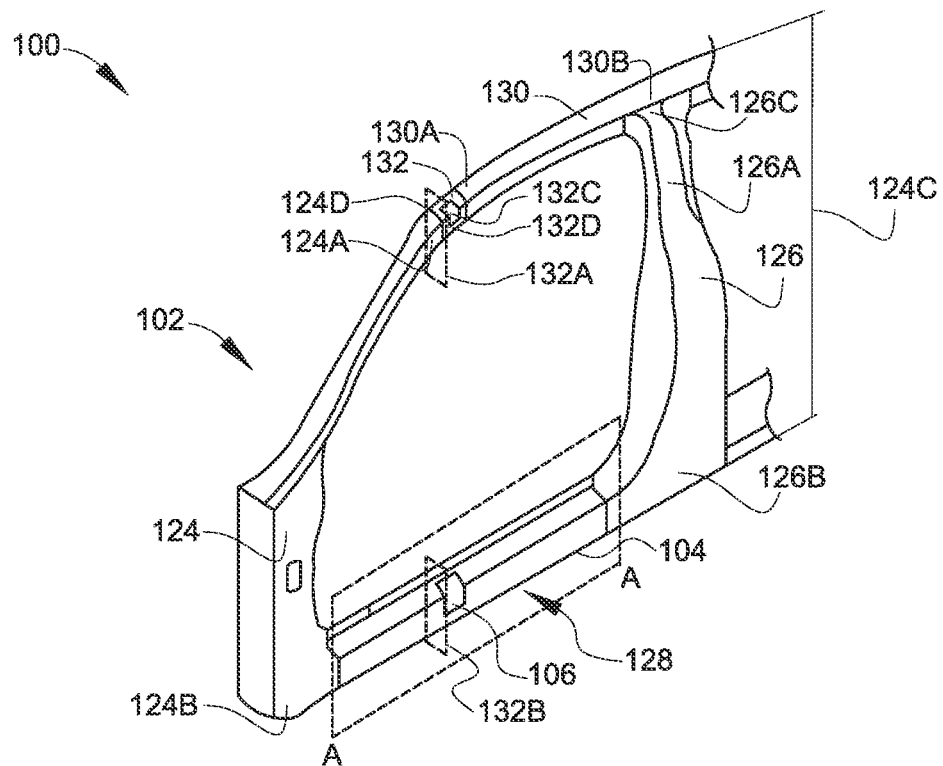
FIGS. 1A-1B are diagrams that illustrates an exemplary door ring assembly, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an assembly of frame members, for example, a door ring assembly of a vehicle. The door ring assembly may include a frame member (such as, a side sill assembly, an A-pillar, a B-pillar, and the like). The frame member may include a reinforcement that may be solid-state bonded to a blank to form the frame member. For example, the reinforcement may be integrally bonded to the blank via the solid-state bonding (such as an ultrasonic additive manufacturing (UAM) process) to form the frame member. The frame member may be formed with an optimal thickness (such as between 1.6 mm to 6 mm), via the UAM process, such that, the door ring assembly may have an optimal weight, which may improve a dynamic performance and a fuel economy of the vehicle.

Further, as the reinforcement is solid-state bonded (such as via the UAM process) to the blank to form the frame member of the door ring assembly, there may not be a need for additional metal joining processes (such as brazing, spot welding, etc.) or additional consumable materials (such as a filler material, fluxes, shielding gases) that may be required to join the reinforcement with the frame member of the door ring assembly. Therefore, there may be a significant reduction in a cost to form such solid-state reinforced frame member.

Further, because of the solid-state bonding (such as the UAM process), the formed frame member may be free from microstructure defects (such as pores, non-metallic inclusions, etc.) and may include the reinforcement at selective locations without any microstructure defects. Therefore, the selective locations of the reinforcement may further enhance an impact load path of the frame members with significantly reduced cost, such that the enhanced impact load path may form a minimal deformation into an occupant space, in an event of a vehicle collision.

In an embodiment, the frame member may include a body, a first leg, and a second leg. The first leg and the second leg may extend outward from the body. For example, the first leg and the second leg may extend from either side (such as a top section and a bottom section) of the body, to facilitate a uniformly distributed load path of the body through the first leg and the second leg. The first leg and the second leg may further enhance balancing and stability of the frame member. The first leg may intersect with the body to form a corner radius. The reinforcement may be positioned on at least a portion of the corner radius. Therefore, the reinforcement may reduce a stress concentration that may occur in the corner radius and may further enhance the impact load path of the frame members with significantly reduced cost, such that the enhanced impact load path may form the minimal deformation into the occupant space, in the event of the vehicle collision Reference will now be made in detail to specific aspects or features, examples of which are illustrated in the accompanying drawings. Wherever possible, corresponding or similar reference numbers will be used throughout the drawings to refer to the same or corresponding parts.

Figure 1B:
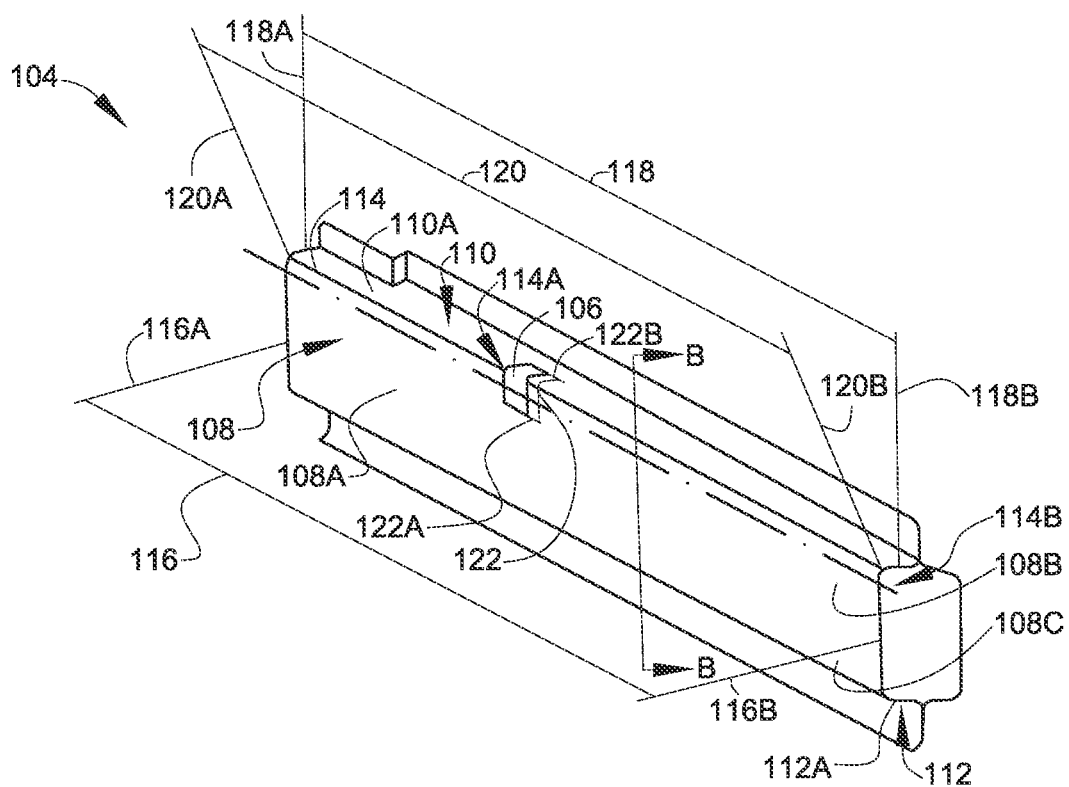

FIGS. 1A-1B are diagrams that illustrates an exemplary door ring assembly, in accordance with an embodiment of the disclosure. With reference to FIGS. 1A, there is shown an exemplary view 100 of a door ring assembly 102 of a vehicle. The door ring assembly 102 may include a frame member 104 that may include a reinforcement 106. The reinforcement 106 may be solid-state bonded (such as based on an Ultrasonic Additive Manufacturing (UAM) process as described, for example in FIG. 3) to the frame member 104 of the door ring assembly 102.

The door ring assembly 102 may be configured to secure the occupant space (not shown) of the vehicle. In an embodiment, the door ring assembly 102 may be disposed adjacent to the occupant space and integrally coupled to a body (not shown) of the vehicle to secure the occupant space. In an even of collision, the door ring assembly 102 may be configured to receive an impact with a minimal deformation to secure the occupant space. In one example, the door ring assembly 102 may include a plurality of frame members (such as the frame member 104) that may be integrally coupled to the body of the vehicle to secure the occupant space. The plurality of frame members of the door ring assembly 102 may be assembled to form the door ring assembly 102 with a substantially rectangular structure. The plurality of frame members of the door ring assembly 102 may also be assembled to form other structure, such as, but not limited to, an arcuate structure, a polygonal structure, etc. In another example, the door ring assembly 102 may be formed from a single frame member that may be integrally coupled to the body of the vehicle to secure the occupant space.

The frame member 104 may be included in the door ring assembly 102. For example, the frame member 104 may be an integral part of the door ring assembly 102. In another example, the frame member 104 may be assembled with the plurality of frame members to form the door ring assembly 102. In one embodiment, the frame member 104 may be a side sill of the vehicle that forms the door ring assembly 102. In other embodiment, the frame member 104 may be an assembly component that may be required to form the door ring assembly 102. The assembly component may include, but not limited to, an A-pillar, a B-pillar, or a roof rail, which forms the door ring assembly 102. In the event of collision, the frame member 104 of the door ring assembly 102 may be configured to receive an impact with a minimal deformation to secure the occupant space.

In an embodiment, the frame member 104 may be formed from a stamped composite material or blank, which may be configured to secure the occupant space. The stamped composite material or blank may include at least one of: a metal particle (such as steel alloys, aluminum alloys, titanium alloys, magnesium alloys, copper alloys, and the like), a polymer (such as thermosets, thermoplastic, and the like), a resin (such as polyesters, vinyl-esters, epoxy resins, and the like), or a ceramic material (such as a carbon material, a silicon carbide material, a mullite material, and the like). In another embodiment, the frame member 104 may have a substantially rectangular structure to secure the occupant space. The frame member 104 may have any other structure, such as, but not limited to, an arcuate structure, a polygonal structure, etc. The frame member 104 may be formed with the optimal thickness (such as between 1.6 mm to 6 mm), via the UAM process, such that the door ring assembly 102 may have the optimal weight, which may improve the dynamic performance and the fuel economy of the vehicle. In a preferred embodiment, the frame member 104 may include the reinforcement 106.

The reinforcement 106 may be configured to be solid-state bonded (such as via the UAM process) to the frame member 104. In an embodiment, the reinforcement 106 may be bonded at selective locations of the frame member 104, such that the selective locations of the reinforcement 106 may form an enhanced impact load path for the frame member 104. In the event of the vehicle collision, the enhanced impact load path may facilitate a minimal deformation into the occupant space. In an embodiment, the reinforcement 106 may include at least one of: a laminated reinforcement material, a fiber reinforcement material, or a particulate reinforcement material. For example, the reinforcement 106 may be include at least one of: fibers (such as titanium, carbon, glass, high strength steel wires, and the like), fillers (such as particle fillers, microspheres, and the like), whiskers, flakes, and the like. In an embodiment, the reinforcement 106 may be positioned on the frame member 104 in an inverted L-shaped structure. However, the reinforcement 106 may also have any other structure, such as, but not limited to, a C-shaped structure, a V-shaped structure, etc. Details of the reinforcement 106 of the frame member 104 are further explained, for example, in FIGS. 1B, 2A, 2B, and 3.

With reference to FIG. 1B, there is shown a perspective cut-out view of the frame member 104 from a block A-A of the door ring assembly 102 in FIG. 1A. The frame member 104 may include a body 108 and a first leg 110 that may extend outward from the body 108. In an embodiment, the frame member 104 may further include a second leg 112 that may be located opposite to the first leg 110 and may extend outward from the body 108. In an embodiment, the first leg 110 may intersect with the body 108 to form a corner radius 114, and the reinforcement 106 may be positioned on at least a portion 114A of the corner radius 114, as shown in FIG. 1B.

The body 108 of the frame member 104 may have a vertical section 108A. In an embodiment, the vertical section 108A may be configured to be formed (for example, via the UAM process) as a sheet metal that may facilitate a reduction in weight of the frame member 104, which may eventually improve the fuel economy of the vehicle. In an embodiment, the body 108 may have a first length 116 that may extend from a first end 116A of the body 108 to a second end 116B of the body 108. In an embodiment, the body 108 may have a substantially flat profile. In another embodiment, the body 108 may also have any other profiles, such as, but not limited to, a corrugated profile, a protruded profile, an indented profile, etc. The body 108 may further have a top section 108B and a bottom section 108C. The top section 108B of the body 108 may extend to form the first leg 110, and the bottom section 108C may extend to form the second leg 112.

The first leg 110 may extend outward from the body 108. For example, the first leg 110 may extend perpendicularly outward from the top section 108B of the body 108. In another example, the first leg 110 may extend outward at a specific angle (such as at 45 degrees) from the top section 108B of the body 108, based on a user preference. Examples of the user preference may include, but not limited to, a manufacturer preference at a time of manufacturing the frame member 104, or an operator preference at a time of assembling the frame member 104 with the vehicle, or a purchaser preference upon purchase of the vehicle to improve ergonomics and/or aesthetics of the vehicle. In an embodiment, the first leg 110 may have a second length 118 that may extend from a first edge 118A of the first leg 110 to a second edge 118B of the first leg 110. In an embodiment, the second length 118 may be substantially same as the first length 116. In another embodiment, the second length 118 may be different compared to the first length 116. In one example, the first end 116A of the body 108 may be located substantially perpendicular to the first edge 118A of the first leg 110. In another example, the second end 116B of the body 108 may be located substantially perpendicular to the second edge 118B of the first leg 110. In yet another example, at least one of the first end 116A or the second end 116B of the body 108 may be located at the specific angle (such as at 45 degrees), from at least one of the first edge 118A or the second edge 118B of the first leg 110, respectively.

In an embodiment, the first leg 110 may have a first horizontal section 110A. In one implementation, the first horizontal section 110A may be configured to be formed (for example, via the UAM process) as a sheet metal that may facilitate a reduction in weight of the frame member 104, which may eventually improve the fuel economy of the vehicle. In an embodiment, the first leg 110 may have a substantially flat profile. In another embodiment, the first leg 110 may also have any other profiles, such as, but not limited to, a corrugated profile, a protruded profile, an indented profile, etc. In an embodiment, the top section 108B of the body 108 may be supported by the first leg 110 and the bottom section 108C of the body 108 may be supported by the second leg 112.

The second leg 112 may extend outward from the body 108. For example, the second leg 112 may extend perpendicularly outward from the bottom section 108C of the body 108. In another example, the second leg 112 may extend outward at a specific angle (such as at 45 degrees) from the bottom section 108C of the body 108, based on the user preference. In an embodiment, the second leg 112 may have a second horizontal section 112A. In one implementation, the second horizontal section 112A may be configured to be formed (for example, via the UAM process) as a sheet metal that may facilitate a reduction in weight of the frame member 104, which may eventually improve the fuel economy of the vehicle. In an embodiment, the second leg 112 may have a substantially flat profile. In another embodiment, the second leg 112 may also have any other profiles, such as, but not limited to, a corrugated profile, a protruded profile, an indented profile, etc. The functions of the second leg 112 may be same as the functions of the first leg 110. Therefore, the further description of the second leg 112 is omitted from the disclosure for the sake of brevity. In an embodiment, the first leg 110 and the second leg 112 may extend from corresponding sides (such as the top section 108B and the bottom section 108C) of the body 108, to facilitate a uniformly distributed load path of the body 108, via the first leg 110 and the second leg 112, respectively. The first leg 110 and the second leg 112 may further enhance balancing and stability of the frame member 104. In an embodiment, the first leg 110 may intersect with the body 108 to form the corner radius 114.

The corner radius 114 may be formed at an intersection of the body 108 and at least one of: the first leg 110 or the second leg 112. In an embodiment, the corner radius 114 may be formed at an intersection between the top section 108B of the body 108 and the first leg 110. In another embodiment, the corner radius 114 may be formed at an intersection between the bottom section 108C of the body 108 and the second leg 112. In an embodiment, the corner radius 114 may have an axis 114B extending along a third length 120 from a first extent 120A of the axis 114B to a second extent 120B of the axis 114B. In an embodiment, the corner radius 114 may extend along the third length 120 from the first extend 120A of the axis 114B to the second extent 120B of the axis 114B. In an example, the third length 120 of the corner radius 114 may be substantially same as the first length 116 of the body 108. In another embodiment, the third length 120 of the corner radius 114 may be different compared to the first length 116 of the body 108. In one example, the first end 116A of the body 108 may be located substantially parallel to the first extent 120A of the axis 114B of the corner radius 114. In another example, the second end 116B of the body 108 may be located substantially parallel to the second extent 120B of the axis 114B of the corner radius 114. In yet another example, at least one of the first end 116A or the second end 116B of the body 108 may be located at the specific angle (such as at 45 degrees), from at least one of the first extent 120A or the second extent 120B of the axis 114B of the corner radius 114, respectively.

In an embodiment, the third length 120 of the corner radius 114 may be substantially same as the second length 118 of the first leg 110. In another embodiment, the third length 120 of the corner radius 114 may be different compared to the second length 118 of the first leg 110. In yet another embodiment, the third length 120 of the corner radius 114 may be different compared to the first length 116 of the body 108 and the second length 118 of the first leg 110. In one example, the first edge 118A of the first leg 110 may be located substantially parallel to the first extent 120A of the axis 114B of the corner radius 114. In another example, the second edge 118B of the first leg 110 may be located substantially parallel to the second extent 120B of the axis 114B of the corner radius 114. In yet another example, at least one of the first edge 118A or the second edge 118B of the first leg 110 may be located at the specific angle (such as at 45 degrees), from at least one of the first extent 120A or the second extent 120B of the axis 114B of the corner radius 114, respectively. In an embodiment, the corner radius 114 may have at least the portion 114A to position the reinforcement 106. In one example, the portion 114A of the corner radius 114 may be located at a location adjacent to the first extent 120A of the axis 114B of the corner radius 114 to position the reinforcement 106. In another example, the portion 114A of the corner radius 114 may be located at a location adjacent to the second extent 120B of the axis 114B of the corner radius 114 to position the reinforcement 106. In yet another example, the portion 114A of the corner radius 114 may be located at a mid-point between the first extent 120A and the second extent 120B of the axis 114B of the corner radius 114 to position the reinforcement 106. In yet another example, the portion 114A of the corner radius 114 may be located between the mid-point and the first extent 120A, or may be located between the mid-point and the second extent 120B, to position the reinforcement 106.

The reinforcement 106 may be positioned in at least the portion 114A of the corner radius 114, as shown in FIG. 1B. Therefore, the reinforcement 106 may reduce a stress concentration that may occur in the corner radius 114 and may further enhance the impact load path of the frame member 104 with significantly reduced cost, such that the enhanced impact load path may form the minimal deformation into the occupant space, in the event of the vehicle collision. In an embodiment, the reinforcement 106 may be positioned in the portion 114A of the corner radius 114 and may extend to the body 108. For example, the reinforcement 106 may extend to the vertical section 108A of the body 108. In another embodiment, the reinforcement 106 may be positioned in the portion 114A of the corner radius 114 and may extend to the first leg 110. For example, the reinforcement 106 may extend to the first horizontal section 110A of the first leg 110. In another example, the reinforcement 106 may be configured to extend between the top section 108B of the body 108 and the first leg 110. In yet another embodiment, the reinforcement 106 may be positioned in the portion 114A of the corner radius 114 and may extend to the second leg 112. For example, the reinforcement 106 may extend to the second horizontal section 112A of the second leg 112. In another example, the reinforcement 106 may be configured to extend between the bottom section 108C of the body 108 and the second leg 112.

In an embodiment, the reinforcement 106 may have a fourth length 122 that may extend from a first portion 122A of the reinforcement 106 to a second portion 122B of the reinforcement 106. In an embodiment, the fourth length 122 of the reinforcement 106 may be positioned substantially perpendicular to the third length 120 of the axis 114B of the corner radius 114. For example, the fourth length 122 of the reinforcement 106 may have a point (for example, a mid-point located between the first portion 122A and the second portion 122B) that may perpendicularly intersect the third length 120 of the axis 114B of the corner radius 114. In an embodiment, the first portion 122A of the reinforcement 106 may be positioned on at least the portion 114A of the corner radius 114 that may extend from the vertical section 108A of the body 108. For example, the first portion 122A of the reinforcement 106 may be positioned substantially perpendicular to the first length 116 of the body 108 and may extend from the vertical section 108A of the body 108.

In another embodiment, the second portion 122B of the reinforcement 106 may be positioned on at least the portion 114A of the corner radius 114 that may extend from the first horizontal section 110A of the first leg 110. For example, the second portion 122B of the reinforcement 106 may be positioned substantially perpendicular to the second length 118 of the first leg 110 and may extend from the first horizontal section 110A of the first leg 110. In yet another embodiment, the second portion 122B of the reinforcement 106 may be positioned on at least the portion 114A of the corner radius 114 that may extend from the second horizontal section 112A of the second leg 112. In yet another embodiment, at least one of: the first portion 122A or the second portion 122B of the reinforcement 106 may be positioned at a specific angle (for example, at 100 degrees) that may extend from at least one of: the vertical section 108A of the body 108, or the first horizontal section 110A of the first leg 110, respectively. It may be noted that the position of the reinforcement 106 shown in FIG. 1B is presented merely as an example. The present disclosure may be also applicable to other positions of the reinforcement 106, without deviation from the scope of the disclosure. For example, the reinforcement 106 may also be positioned in one of, the A-pillar 124, the B-pillar 126, the stamped side sill assembly 128, the roof rail 130 and/or the mating flange 132 (shown in FIG. 1A).

In operation, the reinforcement 106 may be solid-state bonded on a blank (as described in FIG. 3) to form the frame member 104. Further, the frame member 104 may be formed in such a way that the frame member 104 may have the body 108 that may intersect with the first leg 110 to form the corner radius 114. Further, the reinforcement 106 may be positioned on at least the portion 114A of the corner radius 114. Therefore, the reinforcement 106 may reduce a stress concentration that may occur in the corner radius 114 and may further enhance the impact load path of the door ring assembly 102 with significantly reduced cost, such that the enhanced impact load path may form the minimal deformation of the door ring assembly 102 into the occupant space, in the event of the vehicle collision.

Referring back to FIG. 1A, there is shown the door ring assembly 102. The door ring assembly 102 may further include an A-pillar 124, a B-pillar 126, and a stamped side sill assembly 128. The door ring assembly 102 may further include a roof rail 130 that may be configured to be secured with the A-pillar 124, via a mating flange 132.

The A-pillar 124 may be included in the door ring assembly 102 as a vertical support of the vehicle. For example, the A-pillar 124 may be an integral part of the door ring assembly 102. In another example, the A-pillar 124 may be assembled with the plurality of frame members to form the door ring assembly 102. In an embodiment, the A-pillar 124 may include the reinforcement 106. In the event of collision, the A-pillar 124 of the door ring assembly 102 may be configured to receive an impact with a minimal deformation to secure the occupant space. In an embodiment, the A-pillar 124 may be formed from a stamped composite material (or a stamped composite blank), which may be configured to secure the occupant space. The stamped composite material or the stamped composite blank may include at least one of: a metal particle (such as steel alloys, aluminum alloys, titanium alloys, magnesium alloys, copper alloys, and the like), a polymer (such as thermosets, thermoplastic, and the like), a resin (such as polyesters, vinyl-esters, epoxy resins, and the like), or a ceramic material (such as a carbon material, a silicon carbide material, a mullite material, and the like). In another embodiment, the A-pillar 124 may have a substantially rectangular structure to secure the occupant space. However, A-pillar 124 may have any other structure, such as, but not limited to, an arcuate structure, a polygonal structure, etc. In yet another embodiment, the A-pillar 124 may have a surface that may have a substantially flat profile. In another embodiment, the surface of the A-pillar 124 may also have any other profiles, such as, but not limited to, a corrugated profile, a protruded profile, an indented profile, etc. In an embodiment, the A-pillar 124 may be formed with an optimal thickness (such as between 1.6 mm to 6 mm), via the UAM process, such that, the A-pillar 124 may have an optimal weight, which may improve a dynamic performance and the fuel economy of the vehicle. In an embodiment, the A-pillar 124 may include an upper portion 124A and a lower portion 124B.

The upper portion 124A of the A-pillar 124 may extend along a length 124C of the vehicle to a rearward end 124D of the A-pillar 124. In an embodiment, the upper portion 124A may be configured to be formed (for example, via the UAM process) as a sheet metal that may facilitate a reduction in weight of the A-pillar 124, which may eventually improve the fuel economy of the vehicle. In an embodiment, based on a location (such as the rearward end 124D) of the upper portion 124A of the A-pillar 124, the reinforcement 106 may be positioned longitudinally along the first length 116 of the body 108 (shown in FIG. 1B).

The lower portion 124B of the A-pillar 124 may be located opposite to the upper portion 124A of the A-pillar 124, as shown in FIG. 1A. In an embodiment, the lower portion 124B may be configured to be formed (for example, via the UAM process) as a sheet metal that may facilitate a reduction in weight of the A-pillar 124, which may eventually improve the fuel economy of the vehicle. In an embodiment, based on a location (such as a starting point) of the lower portion 124B of the A-pillar 124, the reinforcement 106 may be positioned longitudinally along the first length 116 (shown in FIG. 1B) of the body 108. In another embodiment, the reinforcement 106 may also be positioned in the B-pillar 126.

The B-pillar 126 may be included in the door ring assembly 102 as a vertical support of the vehicle. For example, the B-pillar 126 may be an integral part of the door ring assembly 102. In another example, the B-pillar 126 may be assembled with the plurality of frame members to form the door ring assembly 102. In an embodiment, the B-pillar 126 may include the reinforcement 106. In the event of collision, the B-pillar 126 of the door ring assembly 102 may be configured to receive an impact with a minimal deformation to secure the occupant space. In an embodiment, the B-pillar 126 may be formed from a stamped composite material (or stamped composite blank), which may be configured to secure the occupant space. The stamped composite material may include at least one of: a metal particle (such as steel alloys, aluminum alloys, titanium alloys, magnesium alloys, copper alloys, and the like), a polymer (such as thermosets, thermoplastic, and the like), a resin (such as polyesters, vinyl-esters, epoxy resins, and the like), or a ceramic material (such as a carbon material, a silicon carbide material, a mullite material, and the like). In another embodiment, the B-pillar 126 may have a substantially rectangular structure to secure the occupant space. However, B-pillar 126 may have any other structure, such as, but not limited to, an arcuate structure, a polygonal structure, etc. In yet another embodiment, the B-pillar 126 may have a surface that may have a substantially flat profile. In another embodiment, the surface of the B-pillar 126 may also have any other profiles, such as, but not limited to, a corrugated profile, a protruded profile, an indented profile, etc. In an embodiment, the B-pillar 126 may be formed with an optimal thickness (such as between 1.6 mm to 6 mm), via the UAM process, such that, the B-pillar 126 may have an optimal weight, which may improve a dynamic performance and the fuel economy of the vehicle. In an embodiment, the B-pillar 126 may include an upper portion 126A and a lower portion 126B.

The upper portion 126A of the B-pillar 126 may extend along the length 124C of the vehicle to a rearward end 126C of the B-pillar 126. In an embodiment, the upper portion 126A may be configured to be formed (for example, via the UAM process) as a sheet metal that may facilitate a reduction in weight of the B-pillar 126, which may eventually improve the fuel economy of the vehicle. In an embodiment, based on a location (such as the rearward end 126C) of the upper portion 126A of the B-pillar 126, the reinforcement 106 may be positioned longitudinally along the first length 116 of the body 108.

The lower portion 126B of the B-pillar 126 may be located opposite to the upper portion 126A of the B-pillar 126, as shown in FIG. 1A. In an embodiment, the lower portion 126B may be configured to be formed (for example, via the UAM process) as a sheet metal that may facilitate a reduction in weight of the B-pillar 126, which may eventually improve the fuel economy of the vehicle. In an embodiment, based on a location (such as a starting point) of the lower portion 126B of the B-pillar 126, the reinforcement 106 may be positioned longitudinally along the first length 116 of the body 108. In a preferred embodiment, the reinforcement 106 may be positioned on the stamped side sill assembly 128.

The stamped side sill assembly 128 may be formed (such as via the UAM process) from the blank (shown in FIG. 3) as a sheet metal that may facilitate a reduction in weight of the stamped side sill assembly 128, which may eventually improve the fuel economy of the vehicle. In an embodiment, the stamped side sill assembly 128 may include the reinforcement 106 that may be solid state bonded to the blank. Description of the solid-state bonding of the reinforcement 106 is further explained, for example, in FIG. 3. In an embodiment, the structure, and functions of the stamped side sill assembly 128 may be same as the functions of the structure and functions of the frame member 104. Therefore, the further description and definition of the stamped side sill assembly 128 is omitted from the disclosure for the sake of brevity. In one embodiment, the stamped side sill assembly 128 may be held by a support of the A-pillar 124 and the B-pillar 126. The stamped side sill assembly 128 may include the body 108 that may have the first length 116, which may extend from the first end 116A of the body 108 to the second end 116B of the body 108 as shown in FIG. 1B. The first end 116A may be secured to the lower portion 124B of the A-pillar 124. For example, the first end 116A may be secured to the starting point of the lower portion 124B of the A-pillar 124. The second end 116B may be secured to the lower portion 126B of the B-pillar 126. For example, the second end 116B may be secured to the starting point of the lower portion 126B of the B-pillar 126. Similarly, the upper portion 126A of the B-pillar 126 and the upper portion 124A of the A-pillar 124 may be coupled with the roof rail 130 as shown in FIG. 1A.

The roof rail 130 of the vehicle may be secured to the rearward end 124D of the upper portion 124A of the A-pillar 124. In an embodiment, the roof rail 130 may be included in the door ring assembly 102 as a horizontal support of the vehicle. For example, the roof rail 130 may be an integral part of the door ring assembly 102. In another example, the roof rail 130 may be assembled with the plurality of frame members to form the door ring assembly 102. In an embodiment, the roof rail 130 may include the reinforcement 106. In the event of collision, the roof rail 130 of the door ring assembly 102 may be configured to receive an impact with a minimal deformation to secure the occupant space. In an embodiment, the roof rail 130 may be formed from a stamped composite material or a stamped composite blank, which may be configured to secure the occupant space. In an embodiment, the roof rail 130 may have a substantially rectangular structure to secure the occupant space. In another embodiment, the roof rail 130 may have any other structure, such as, but not limited to, an arcuate structure, a polygonal structure, etc. In yet another embodiment, the roof rail 130 may have a surface that may have a substantially flat profile. In another embodiment, the surface of the roof rail 130 may also have any other profiles, such as, but not limited to, a corrugated profile, a protruded profile, an indented profile, etc. In an embodiment, the roof rail 130 may be formed with an optimal thickness (such as between 1.6 mm to 6 mm), via the UAM process, such that, the roof rail 130 may have an optimal weight, which may improve a dynamic performance and a fuel economy of the vehicle. In an embodiment, the roof rail 130 may include a first area 130A and a second area 130B.

The first area 130A of the roof rail 130 may be coupled to the rearward end 124D of the A-pillar 124. In an embodiment, the first area 130A may be configured to be formed (for example, via the UAM process) as a sheet metal that may facilitate a reduction in weight of the roof rail 130, which may eventually improve the fuel economy of the vehicle. In an embodiment, based on a location (such as the first area 130A) of the roof rail 130, the reinforcement 106 may be positioned longitudinally along the first length 116 of the body 108.

The second area 130B of the roof rail 130 may be located opposite to the first area 130A of the roof rail 130, as shown in FIG. 1A. In an embodiment, the second area 130B may be configured to be formed (for example, via the UAM process) as a sheet metal that may facilitate a reduction in weight of the roof rail 130, which may eventually improve the fuel economy of the vehicle. In an embodiment, based on a location (such as the second area 130B) of the roof rail 130, the reinforcement 106 may be positioned longitudinally along the first length 116 of the body 108. In an embodiment, the second area 130B of the roof rail 130 may be coupled with the upper portion 126A of the B-pillar 126. In another embodiment, the first area 130A of the roof rail 130 may be coupled with the rearward end 124D of the A-pillar 124, via the mating flange 132, as shown in FIG. 1A.

The mating flange 132 may be configured to secure the roof rail 130 with the rearward end 124D of the upper portion 124A of the A-pillar 124. In an embodiment, the reinforcement 106 may be positioned longitudinally along the first length 116 of the body 108, based on a location (for example, at the rearward end 124D) of the mating flange 132 that may be secured to the upper portion 124A of the A-pillar 124. In case the mating flange 132 is coupled to the rearward end 124D of the upper portion 124A at a mating plane 132A, the reinforcement 106 may be positioned longitudinally along the first length 116 of the body 108 at a matching plane 132B. In one example, the matching plane 132B may be substantially same as the mating plane 132A. In another example, the matching plane 132B may be located in such a way that it lies in accordance with the mating plane 132A. In yet another example, the matching plane 132B may be substantially different compared to the mating plane 132A.

In an embodiment, there may be a second reinforcement 132C that may be located on at least a portion 132D of the mating flange 132. The functions of the second reinforcement 132C may be same as the functions of the reinforcement 106. Therefore, the further description of the second reinforcement 132C is omitted from the disclosure for the sake of brevity. In another embodiment, but not shown, the second reinforcement 132C may be independently solid-state bonded on at least the portion 132D of the mating flange 132, without the first reinforcement 106 being solid-state bonded to the stamped side sill assembly 128.

Figure 3:
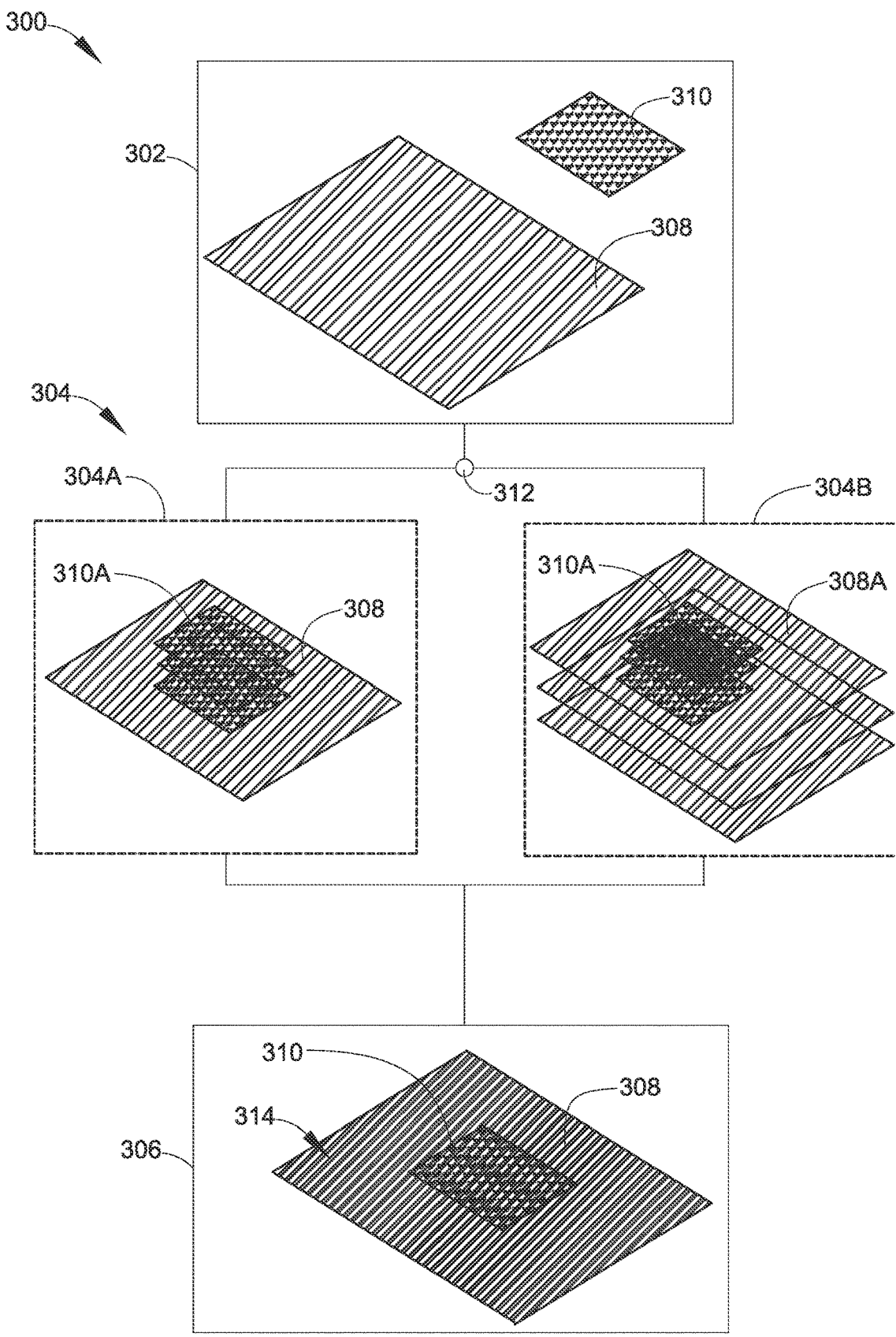
FIG. 3 is a diagram that illustrate exemplary operations for a solid-state bonding of a reinforcement with a blank to form a frame member of the exemplary door ring assembly of FIGS. 1A-1B, in accordance with an embodiment of the disclosure.

In operation, the stamped side sill assembly 128 may be formed from the blank (as shown in FIG. 3) that may include the reinforcement 106 that is solid state bonded (such as, via the UAM process) to the blank. The stamped side sill assembly 128 may include the body 108 that may have the first length 116, which may extend from the first end 116A of the body 108 to the second end 116B of the body 108. Further, the first end 116A may be secured to the lower portion 124B of the A-pillar 124. Further, the second end 116B may be secured to the lower portion 126B of the B-pillar 126. Further, the reinforcement 106 may be positioned longitudinally along the first length 116 of the body 108, based on the location of the upper portion 124A of the A-pillar 124. In an embodiment, the reinforcement 106 may be located on a location of the matching plane 132B that may be positioned longitudinally along the first length 116 of the body 108, based on a location of the mating plane 132A located at the rearward end 124D of the upper portion 124A of the A-pillar 124. In an example, the reinforcement 106 may be located on the location of the matching plane 132B, which may be aligned with location of the mating plane 132A. In another example, the reinforcement 106 may be located on the location of the matching plane 132B, which may be offset from the location of the mating plane 132A.

The reinforcement may be positioned on at least the portion 114A of the corner radius 114 along the first length 116 of the body 108, based on the mating plane 132A located at the rearward end 124D of the A-pillar 124. Therefore, the reinforcement 106 may reduce the stress concentration that may occur in the corner radius 114 and may further enhance the impact load path of the door ring assembly 102 with significantly reduced cost, such that the enhanced impact load path may form the minimal deformation of the door ring assembly 102 into the occupant space, in the event of the vehicle collision. In an embodiment, the reinforcement 106 may be positioned on at least a portion of an inner surface of the corner radius 114 of the body 108, along the first length 116. Description of the inner surface of the corner radius 114 may be further explained, for example, in FIGS. 2A-2B.

Figure 2A:
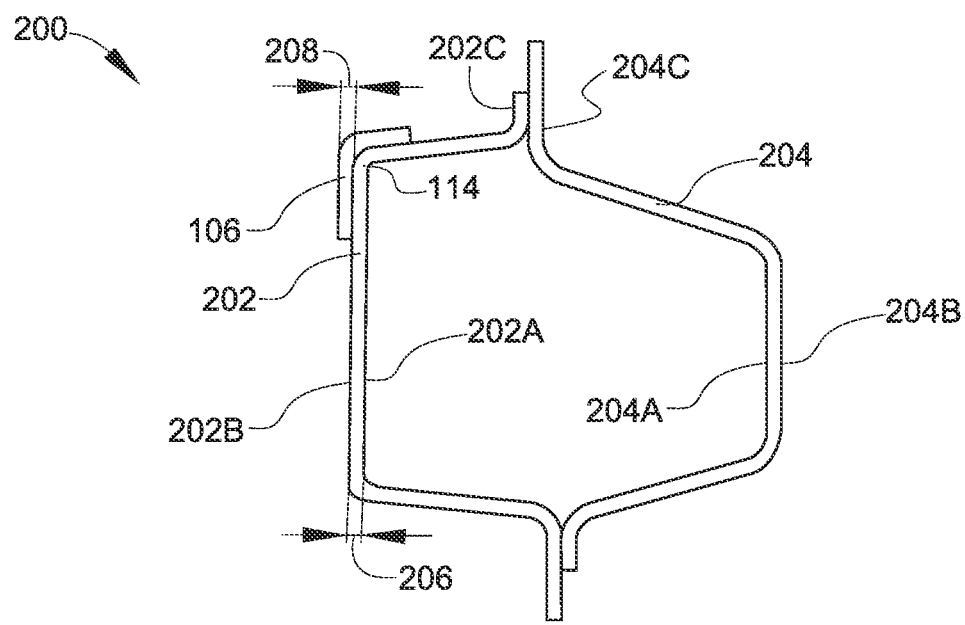
FIGS. 2A-2B are diagrams that illustrates sectional views of a frame member of the exemplary door ring assembly of FIGS. 1A-1B, in accordance with an embodiment of the disclosure.
Figure 2B:
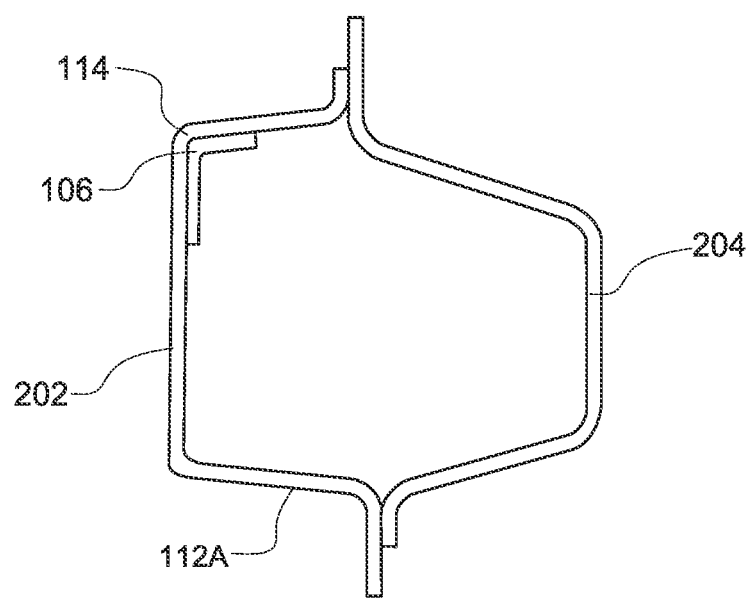

FIGS. 2A-2B are diagrams that illustrates sectional views of a frame member of the exemplary door ring assembly of FIGS. 1A-1B, in accordance with an embodiment of the disclosure. FIGS. 2A-2B are explained in conjunction with elements from FIGS. 1A-1B. With reference to FIG. 2A, there is shown a sectional view 200 of the frame member 104 along a section B-B (shown in FIG. 1B). The frame member 104 may further include an inboard component 202 and an outboard component 204.

The inboard component 202 may be configured to be solid-state bonded with the reinforcement 106. For example, the reinforcement 106 may be selected based on a material of the inboard component 202 and the selected reinforcement 106 may be solid-state bonded (such as, via the UAM process) to the inboard component 202 of the frame member 104. The material of the inboard component 202 may include, but not limited to, a stamped composite material, such as, a metal particle, a polymer, a resin, or a ceramic material, or its combination. In an embodiment, the inboard component 202 may include an inner surface 202A and an outer surface 202B. The inboard component 202 may be located in such a way that the reinforcement 106 may be positioned in at least one of: the inner surface 202A or the outer surface 202B. In an embodiment, the inboard component 202 may further include a fin 202C that may be configured to couple with the outboard component 204 as shown in FIG. 2A.

In an alternate embodiment, although not shown, the outboard component 204 may also be configured to be solid-state bonded with the reinforcement 106. For example, the reinforcement 106 may be selected based on a material of the outboard component 204 and the selected reinforcement 106 may be solid-state bonded (such as, via the UAM process) to the outboard component 204 of the frame member 104. The material of the outboard component 204 may include, but not limited to, a stamped composite material, such as, a metal particle, a polymer, a resin, or a ceramic material, or its combination. In an embodiment, the outboard component 204 may include an inner surface 204A and an outer surface 204B. The outboard component 204 may be located in such a way that the reinforcement 106 may be positioned in at least one of: the inner surface 204A or the outer surface 204B. In an embodiment, the outboard component 204 may further include a fin 204C that may be configured to mate with the fin 202C of the inboard component 202 to form the frame member 104, as shown in FIG. 2A.

In an embodiment, the reinforcement 106 may be positioned on at least the portion 114A of an outer surface of the corner radius 114 as shown in FIGS. 1B and 2A. The outer surface of the corner radius 114 may be formed based on at least one of: the outer surface 202B of the inboard component 202 or the outer surface 204B of the outboard component 204. In an alternate embodiment, the reinforcement 106 may be positioned on at least the portion 114A of an inner surface of the corner radius 114 as shown in FIG. 2B. The inner surface of the corner radius 114 may be formed based on at least one of: the inner surface 202A of the inboard component 202 or the inner surface 204A of the outboard component 204 of the frame member 104, based on the outer surface of the corner radius 114. For example, in case the outer surface of the corner radius 114 is formed from the outer surface 202B of the inboard component 202, then the inner surface of the corner radius 114 may be formed from the inner surface 202A of the inboard component 202. In another example, in case the outer surface of the corner radius 114 is formed from the outer surface 204B of the outboard component 204, then the inner surface of the corner radius 114 may be formed from the inner surface 204A of the outboard component 204 of the frame member 104

In an embodiment, the frame member 104 may have a first thickness 206 and the reinforcement 106 may have a second thickness 208. In one implementation, the first thickness 206 may be greater than the second thickness 208. For example, the first thickness 206 of the frame member 104 may be formed (such as, via the UAM process) with a range between 1.6 mm to 6 mm in thickness. In another example, the second thickness 208 of the reinforcement 106 may be formed (such as, via the UAM process) with a range between 0.2 mm to 1.6 mm in thickness. Details of the UAM process are further explained, for example, in FIG. 3.

FIG. 3 is a diagram that illustrate exemplary operations for a solid-state bonding of a reinforcement with a blank to form a frame member of the exemplary door ring assembly of FIG. 1, in accordance with an embodiment of the disclosure. FIG. 3 is explained in conjunction with elements from FIGS. 1A-1B, and FIGS. 2A-2B. With reference to FIG. 3, there is shown an exemplary scenario 300 to illustrate a sequence of relative configurations of the UAM process to form the frame member 104. The sequence of relative configurations may include an initial configuration 302, an alignment configuration 304, and a bonded configuration 306.

In the initial configuration 302, there is shown a blank 308 and a reinforcement 310 to form the frame member 104 (shown in FIGS. 1A-1B). The blank 308 may be an unfinished piece of metal that may be stamped out from a larger piece of metal. In an embodiment, the blank 308 may have a substantially rectangular structure. However, the blank 308 may have any other structure, such as, but not limited to, an arcuate structure, a polygonal structure, etc., based on a desired structure of the frame member 104. The reinforcement 310 may be configured to be located on the blank 308 and solid-state bonded to the blank 308 to form the frame member 104. The functions of the reinforcement 310 may be same as the functions of the reinforcement 106. Therefore, the further description of the reinforcement 310 is omitted from the disclosure for the sake of brevity.

In the alignment configuration 304, there is shown a first alignment configuration 304A and a second alignment configuration 304B. The frame member 104 may be formed from one of: the first alignment configuration 304A or the second alignment configuration 304B, based on the user preference at a decision stage 312. For example, the decision stage 312 may be a manufacturing stage, where the solid-state bonding of the reinforcement 310 on the blank 308 may occur.

In case the first alignment configuration 304A is selected at the decision stage 312, the solid-state bonding of the reinforcement 310 on the blank 308 may occur based on the first alignment configuration 304A. The first alignment configuration 304A may include a plurality of layers 310A of the reinforcement 310, which may be solid-state bonded on the blank 308. The functions of each of the plurality of layers 310A of the reinforcement 310 may be same as the functions of the reinforcement 106. Therefore, further description of the plurality of layers 310A of the reinforcement 310 is omitted from the disclosure for the sake of brevity. In an embodiment, the frame member 104 may be formed from an ultrasonic additive manufacturing (UAM) process, which may involve a layer-by-layer ultrasonic welding of the plurality of layers 310A on the blank 308, which is subsequently formed to create the frame member 104. For example, the UAM process may involve the layer-by-layer ultrasonic welding of the plurality of layers 310A on the blank 308 to form a reinforced metal blank 314 (as shown in the bonded configuration 306 of FIG. 3). The reinforced metal blank 314 may be molded to form the frame member 104 as per design requirements.

In an alternate embodiment, in case the second alignment configuration 304B is selected at the decision stage 312, the solid-state bonding of the reinforcement 310 on the blank 308 may occur based on the second alignment configuration 304B. The second alignment configuration 304B may include a plurality of metal foils 308A of the blank 308, where the plurality of metal foils 308A and the plurality of layers 310A of the reinforcement 310 may be solid-state bonded to form the frame member 104. The structure of each of the plurality of metal foils 308A of the blank 308 may be same as the structure of the blank 308. Therefore, the further description of the plurality of metal foils 308A of the blank 308 is omitted from the disclosure for the sake of brevity. In an embodiment, the frame member 104 may be formed from an ultrasonic additive manufacturing (UAM) process, which may include an impregnation of the plurality of layers 310A of the reinforcement 310 on at least one metal foil of the plurality of metal foils 308A of the blank 308, and followed by a layer-by-layer ultrasonic welding of the plurality of metal foils 308A of the blank 308 along with the plurality of layers 310A of the reinforcement 310 to form the frame member 104. For example, the UAM process may involve a layer-by-layer ultrasonic welding of the plurality of layers 310A with the plurality of metal foils 308A of the blank 308, to form the reinforced metal blank 314 (as shown in the bonded configuration 306 of FIG. 3). In an embodiment, the plurality of layers 310A of the reinforcement 310 may be selectively impregnated in one or more areas of the blank 308 prior to forming the frame member 104. The selective impregnation of the plurality of layers 310A of the reinforcement 310 in the blank 308 may facilitate improved impact load path in case of vehicle collisions.

The first alignment configuration 304A and the second alignment configuration 304B are presented merely as an example. The present disclosure may be also applicable to other configurations for solid-state bonding of the reinforcement 310 with the blank 308 to form the frame member 104, without deviation from the scope of the disclosure. For example, although not shown, the reinforcement may be in a powdered form and include at least one of: fibers (such as titanium, carbon, glass, high strength steel wires, and the like), fillers (such as particle fillers, microspheres, and the like), whiskers, flakes, etc. In such scenario, the reinforcement 310 may be impregnated to the at least one layer of the plurality of metal foils 308A of the blank 308. Based on the impregnation of the reinforcement 310 to at least one layer of the plurality of metal foils 308A of the blank 308, the plurality of metal foils 308A of the blank 308 may be ultrasonically welded layer-by-layer along with the impregnated reinforcement 310 to form the reinforced metal blank 314 (as shown in the bonded configuration 306 of FIG. 3). The reinforced metal blank 314 may be molded to form the frame member 104 as per design requirements.

In the bonded configuration 306, there is shown the reinforced metal blank 314. The reinforced metal blank 314 may be molded to form the frame member 104 as per design requirements. Based on the layer-by-layer ultrasonic welding of the plurality of layers 310A of the reinforcement 310 on the blank 308, the frame member 104 may be formed with an optimal thickness (such as between 1.6 mm to 6 mm), such that the door ring assembly 102 may have an optimal weight, which may improve a dynamic performance and a fuel economy of the vehicle. Further, as the reinforcement 310 is impregnated within the blank 308 prior to forming the frame member 104, there may not be a need for additional metal joining processes (such as brazing, spot welding, etc.) or additional consumable materials (such as a filler material, fluxes, shielding gases). Therefore, there may be a significant reduction in a cost to form the disclosed frame member 104.

Further, because of the layer-by-layer ultrasonic welding of the plurality of metal foils 308A of the blank 308 and the reinforcement 310, the formed frame member 104 may be free from microstructure defects (such as pores, non-metallic inclusions, etc.) and may include the reinforcement 310 at selective locations without any microstructure defects. It may be noted that the position of the reinforcement 310 shown in FIG. 3 is presented merely as an example. The present disclosure may be also applicable to other positions of the reinforcement 310, without deviation from the scope of the disclosure. For example, the reinforcement 310 may also be positioned in one of, A-pillar 124, the B-pillar 126, the stamped side sill assembly 128, the roof rail 130 and/or the mating flange 132. Therefore, the selective locations of the reinforcement 310 may further enhance the impact load path of the frame members with significantly reduced cost, such that the enhanced impact load path may form the minimal deformation into the occupant space, in the event of the vehicle collision. Some of the exemplary implementations of the frame member 104 are described, for example in, FIGS. 4 and 5.

Figure 4:
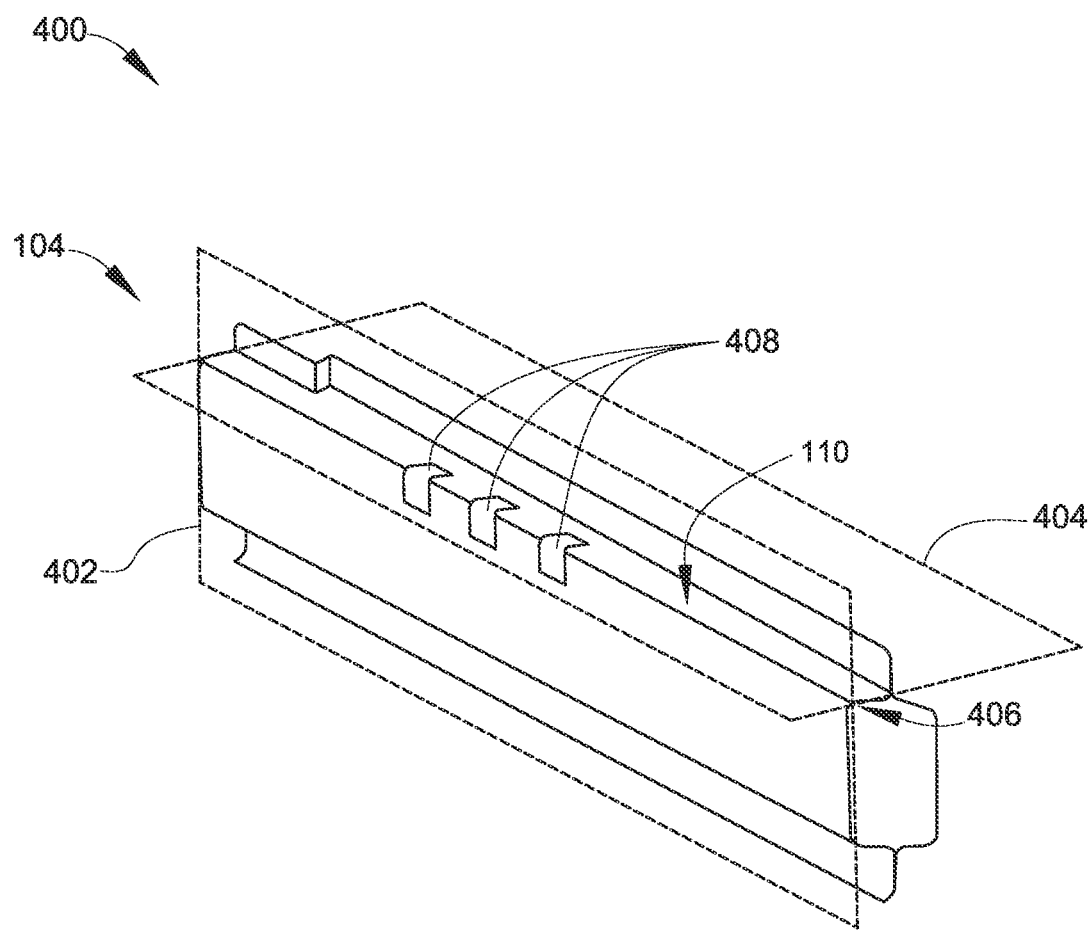
FIG. 4 is a diagram that illustrates a first exemplary implementation of the door ring assembly of FIG. 1A, in accordance with an embodiment of the disclosure.

FIG. 4 is a diagram that illustrates a first exemplary implementation of the door ring assembly of FIG. 1, in accordance with an embodiment of the disclosure. FIG. 4 is explained in conjunction with elements from FIGS. 1A-1B, FIGS. 2A-2B, and FIG. 3. With reference to FIG. 4, there is shown an exemplary implementation 400 of the frame member 104. In the exemplary implementation 400, the frame member 104 may include the body 108 that may be located at a first plane 402. The frame member 104 may further include the first leg 110 that may be located at a second plane 404 as shown in FIG. 4. In an embodiment, the corner radius 114 (shown in FIG. 1B) may be located at an intersection 406 of the first plane 402 and the second plane 404.

In an embodiment, the reinforcement 106 may include a plurality of reinforcements 408. Each of the plurality of reinforcements 408 may have the fourth length 122 (as shown in FIG. 1B) that may extend from the first portion 122A of the each of the plurality of reinforcements 408 to the second portion 122B of the each of the plurality of reinforcements 408. In another embodiment, although not shown, each of the plurality of reinforcements 408 may have different length based on the design requirements of the frame member 104.

In an embodiment, each of the plurality of reinforcements 408 of the reinforcement 106 may be perpendicularly positioned at a predetermined interval along the third length 120 of the corner radius 114 (shown in FIG. 1B). In another embodiment, each of the plurality of reinforcements 408 of the reinforcement 106 may be parallelly positioned at a predetermined interval along the third length 120 of the corner radius 114. In yet another embodiment, each of the plurality of reinforcements 408 of the reinforcement 106 may be angularly positioned (such as at 45 degrees) at a predetermined interval along the third length 120 of the corner radius 114. Therefore, the plurality of reinforcements 408 may further reduce the stress concentration that may occur in the corner radius 114 and may further enhance the impact load path of the door ring assembly 102 with significantly reduced cost, such that the enhanced impact load path may form the minimal deformation of the door ring assembly 102 into the occupant space, in the event of the vehicle collision. It may be noted that the position of the plurality of reinforcements 408 shown in FIG. 4 is presented merely as an example. The present disclosure may be also applicable to other positions of the plurality of reinforcements 408, without deviation from the scope of the disclosure. For example, the plurality of reinforcements 408 may also be positioned in one of, the A-pillar 124, the B-pillar 126, the roof rail 130 and/or the mating flange 132.

Figure 5:
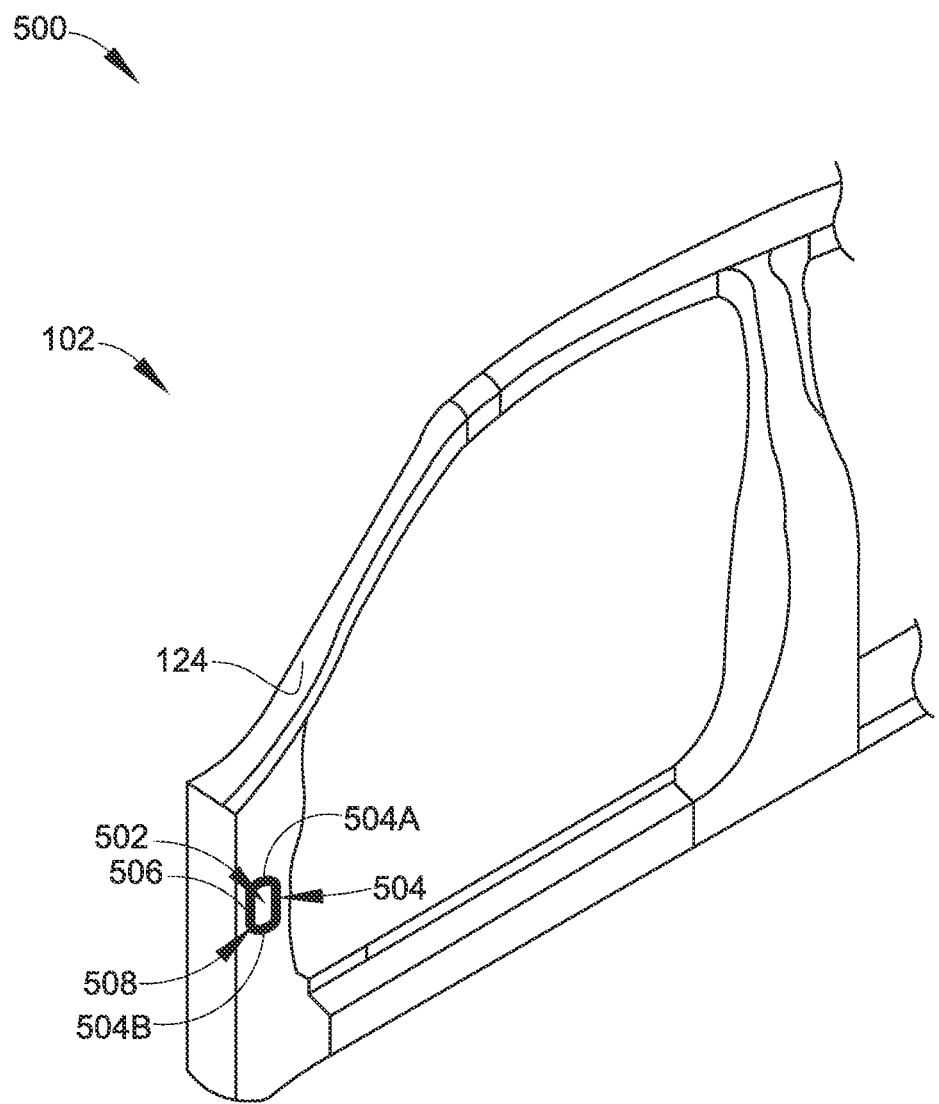
FIG. 5 is a diagram that illustrates a second exemplary implementation of the door ring assembly of FIG. 1A, in accordance with an embodiment of the disclosure.

FIG. 5 is a diagram that illustrates a second exemplary implementation of the door ring assembly of FIG. 1, in accordance with an embodiment of the disclosure. FIG. 5 is explained in conjunction with elements from FIGS. 1A-1B, 2A-2B, 3, and 4. With reference to FIG. 5, there is shown an exemplary implementation 500 of the door ring assembly 102. The door ring assembly 102 may include the A-pillar 124 that may be formed from the blank 308, such as via the UAM process, as described in FIG. 3.

The A-pillar 124 may have an opening 502. Examples of the opening 502 may include, but not limited to, a cut-out, a slit, a slot, and the like. The opening 502 may have a perimeter 504 that may extend from a third end 504A of the opening 502 to a fourth end 504B of the opening 502. In an example, the perimeter 504 may be a circumferential length that may encompass the opening 502. In an embodiment, the A-pillar 124 may be formed from the blank 308 (shown in FIG. 3) that may include a reinforcement 506 that may be solid state bonded (such as, via the UAM process) to the blank 308. The functions of the reinforcement 506 may be same as the functions of the reinforcement 106. Therefore, the further description of the reinforcement 506 is omitted from the disclosure for the sake of brevity.

In an embodiment, the reinforcement 506 may be positioned along at least a portion 508 of the perimeter 504 of the opening 502 in the A-pillar 124. In an embodiment, the portion 508 of the perimeter 504 may be a selective area of the perimeter 504, and the reinforcement 506 may be selectively solid-state bonded to particular selective area of the perimeter 504. In another embodiment, the portion 508 of the perimeter 504 may be a complete area of the perimeter 504, and the reinforcement 506 may be solid-state bonded to complete area of the perimeter 504. Therefore, the reinforcement 506 may further enhance the impact load path of the door ring assembly 102 with significantly reduced cost, such that the enhanced impact load path may form the minimal deformation of the door ring assembly 102 into the occupant space, in the event of the vehicle collision. It may be noted that the position of the reinforcement 506 shown in FIG. 5 is presented merely as an example. The present disclosure may be also applicable to other positions of the reinforcement 506, without deviation from the scope of the disclosure. For example, the reinforcement 506 may also be positioned in one of, the B-pillar 126. the stamped side sill assembly 128, the roof rail 130 and/or the mating flange 132.

Figure 6:
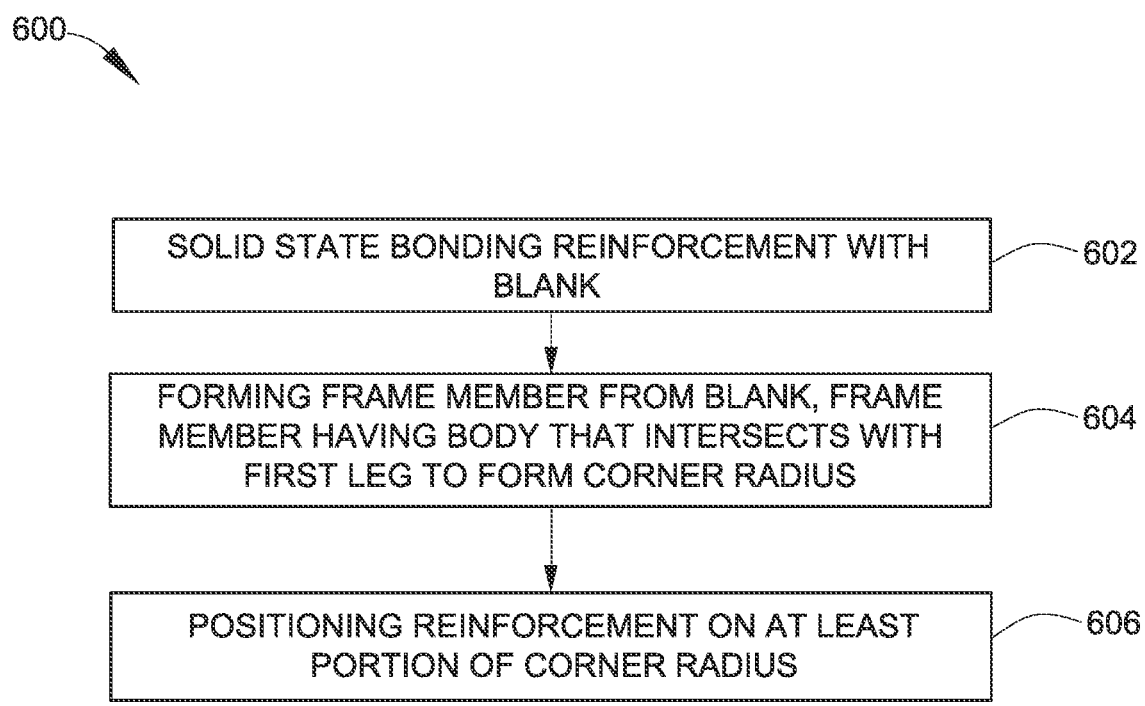
FIG. 6 is a flowchart that illustrates an exemplary method for forming a frame member, in accordance with an embodiment of the disclosure.

FIG. 6 is a flowchart that illustrates an exemplary method for forming a frame member, in accordance with an embodiment of the disclosure. FIG. 6 is explained in conjunction with elements from FIGS. 1A-1B, 2A-2B, 3, 4, and 5. With reference to FIG. 6, there is shown a flowchart 600 that depicts a method for forming the frame member 104 of FIG. 1. The method illustrated in the flowchart 600 may start from 602.

At 602, the reinforcement 106 may be solid-state bonded with the blank 308. In an embodiment, based on the UAM process, the reinforcement 106 may be solid-state bonded with the blank 308, as described in FIG. 3.

At 604, the frame member 104 may be formed from the blank 308. In an embodiment, based on the UAM process, the frame member 104 may be formed from the reinforced metal blank 312 and may be molded to form the body 108 that may intersect with the first leg 110 to form the corner radius 114, as described in FIGS. 1A-1B, 2, and 3.

At 606, the reinforcement 106 may be positioned on at least the portion 114A of the corner radius 114. In an embodiment, based on the UAM process, the reinforcement 106 may be configured to be positioned on at least the portion 114A of the corner radius 114, as described in FIGS. 1A-1B, 2, and 3. Control may pass to end.

The flowchart 600 is illustrated as discrete operations, such as 602, 604, and 606. However, in certain embodiments, such discrete operations may be further divided into additional operations, combined into fewer operations, or eliminated, or rearranged, depending on the implementation without detracting from the essence of the disclosed embodiments.

Figure 7:
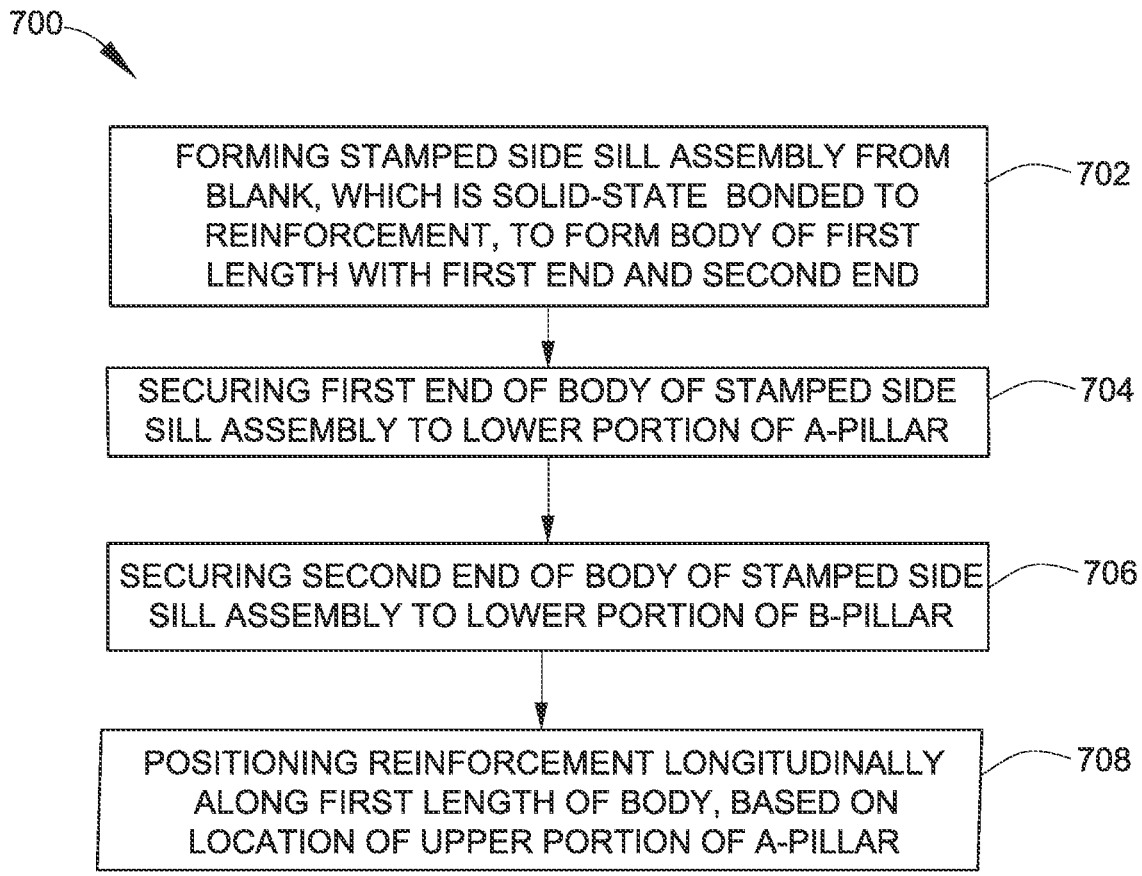
FIG. 7 is a flowchart that illustrates an exemplary method for forming a stamped side sill assembly, in accordance with an embodiment of the disclosure.

FIG. 7 is a flowchart that illustrates an exemplary method for forming a stamped side sill assembly, in accordance with an embodiment of the disclosure. FIG. 7 is explained in conjunction with elements from FIGS. 1A-1B, 2A-2B, 3, 4, and 5. With reference to FIG. 7, there is shown a flowchart 700 that depicts a method for forming the stamped side sill assembly 128 of FIG. 1A. The method illustrated in the flowchart 700 may start from 702.

At 702, the stamped side sill assembly 128 may be formed from the blank 308. In an embodiment, based on the UAM process, the reinforcement 106 may be solid-state bonded with the stamped side sill assembly 128 to form the body 108 of the first length 116 with the first end 116A and the second end 116B, as described in FIGS. 1A-B and 3.

At 704, the first end 116A of the body 108 of the stamped side sill assembly 128 may be secured to the lower portion 124B of the A-pillar 124. In an embodiment, based on the UAM process, the first end 116A of the body 108 of the stamped side sill assembly 128 may be secured to the lower portion 124B of the A-pillar 124 as described in FIGS. 1A-1B and 3.

At 706, the second end 116B of the body 108 of the stamped side sill assembly 128 may be secured to the lower portion 126B of the B-pillar 126. In an embodiment, based on the UAM process, the second end 116B of the body 108 of the stamped side sill assembly 128 may be secured to the lower portion 126B of the B-pillar 126 as described in FIGS. 1A-1B and 3.

At 708, the reinforcement 106 may be positioned longitudinally along the first length 116 of the body 108, based on the location (such as at mating plane 132A) of the upper portion 124A of the A-pillar 124. In an embodiment, based on the UAM process, the reinforcement 106 may be positioned longitudinally along the first length 116 of the body 108, based on the location (such as at mating plane 132A)

of the upper portion 124A of the A-pillar 124 as described in FIGS. 1A-1B, 2, and 3. Control may pass to end.

The flowchart 700 is illustrated as discrete operations, such as 702, 704, 706, and 708. However, in certain embodiments, such discrete operations may be further divided into additional operations, combined into fewer operations, or eliminated, or rearranged, depending on the implementation without detracting from the essence of the disclosed embodiments.

Figure 8:
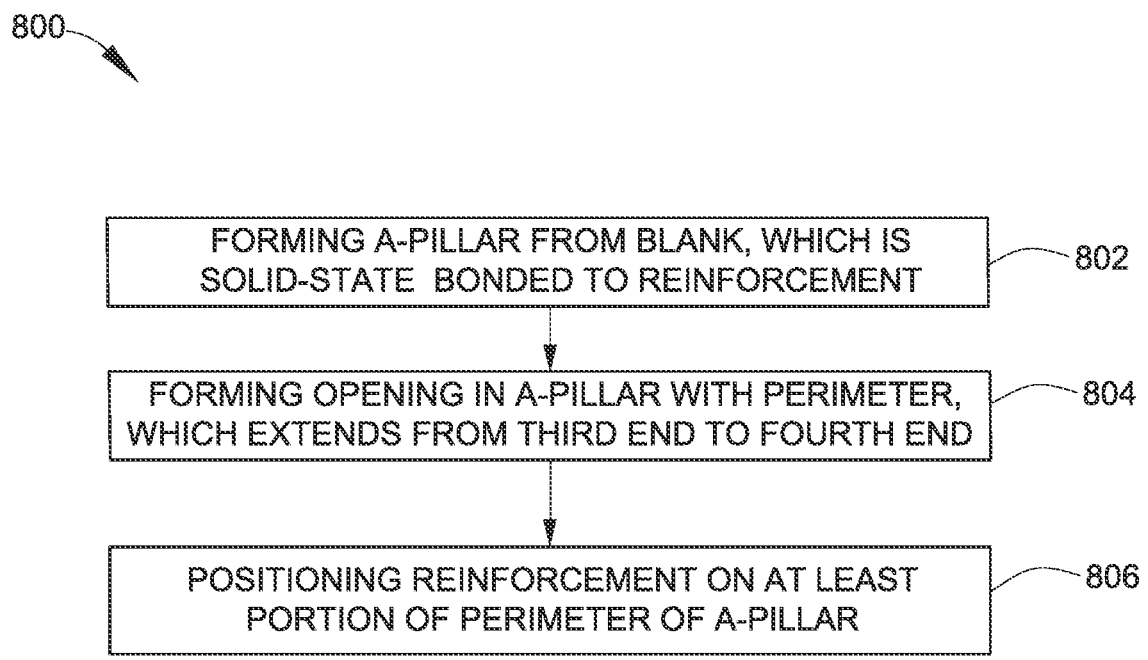
FIG. 8 is a flowchart that illustrates an exemplary method for forming an A-pillar, in accordance with an embodiment of the disclosure.

FIG. 8 is a flowchart that illustrates an exemplary method for forming an A-pillar, in accordance with an embodiment of the disclosure. FIG. 8 is explained in conjunction with elements from FIGS. 1A-1B, 2A-2B, 3, 4 and 5. With reference to FIG. 8, there is shown a flowchart 800 that depicts a method for forming the A-pillar 124 of FIG. 1A and FIG. 5. The method illustrated in the flowchart 800 may start from 802.

At 802, the A-pillar 124 may be formed from the blank 308. In an embodiment, based on the UAM process, the A-pillar 124 may be formed from the blank 308, which is solid-state bonded to the reinforcement 506, as described in FIGS. 1A-1B, 3, and 5.

At 804, the opening 502 may be formed in the A-pillar 124. In an embodiment, based on the UAM process, the opening 502 may be formed in the A-pillar 124 with perimeter 504, which may extend from the third end 504A to the fourth end 504B, as described in FIG. 5.

At 806, the reinforcement 506 may be positioned on at least the portion 508 of the perimeter 504 of the A-pillar 124. In an embodiment, based on the UAM process, the reinforcement 506 may be positioned on at least the portion 508 of the perimeter 504 of the A-pillar 124, as described in FIG. 5. Control may pass to end.

The flowchart 800 is illustrated as discrete operations, such as 802, 804, and 806. However, in certain embodiments, such discrete operations may be further divided into additional operations, combined into fewer operations, or eliminated, or rearranged depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A door ring assembly, comprising:
   an A-pillar that includes an upper portion and a lower portion;
   a B-pillar that includes an upper portion and a lower portion; and
   a frame member comprising a reinforcement that is solid-state bonded to the frame member, the frame member comprising:
      a body; and
      a first leg extending outward from the body, wherein the first leg intersects with the body to form a corner radius, wherein the reinforcement is positioned on at least a portion of the corner radius, wherein
         the portion of the corner radius is located at a mid-point between a first extent of an axis of the corner radius and a second extent of the axis of the corner radius,
         the first extent is at a first starting point of the lower portion of the A-pillar, and
         the second extent is at a second starting point of the lower portion of the B-pillar.

2. The door ring assembly according to claim 1, wherein the frame member comprises an inboard component and an outboard component, and wherein the reinforcement is solid-state bonded to the inboard component of the frame member.

3. The door ring assembly according to claim 1, wherein the frame member is formed from a blank, and wherein the reinforcement is solid-state bonded to the blank to form the frame member.

4. The door ring assembly according to claim 1, wherein the frame member is formed from an ultrasonic additive manufacturing (UAM) process which involves a layer-by-layer ultrasonic welding of a plurality of layers of the reinforcement on a blank to form the frame member.

5. The door ring assembly according to claim 1,
wherein the frame member is formed from a stamped composite blank that includes at least one of: a metal particle, a polymer, a resin, or a ceramic material, and
wherein the reinforcement comprises at least one of: a laminated reinforcement material, a fiber reinforcement material, or a particulate reinforcement material.

6. The door ring assembly according to claim 1, wherein the reinforcement is positioned on at least the portion of an inner surface or an outer surface of the corner radius.

7. The door ring assembly according to claim 1, wherein the body having a first length that extends from a first end of the body to a second end of the body, wherein the first leg having a second length that extends from a first edge of the first leg to a second edge of the first leg,
wherein the first length is substantially same as the second length, and
wherein a horizontal section of the first leg is substantially perpendicular to the body.

8. The door ring assembly according to claim 1, wherein the body having a first length that extends from a first end of the body to a second end of the body, wherein the corner radius having the axis extending along a third length from the first extent of the axis to the second extent of the axis,
wherein the first length is substantially same as the third length, and
wherein the first length is located substantially parallel to the third length.

9. The door ring assembly according to claim 1, wherein the corner radius having the axis extending along a third length from the first extent of the axis to the second extent of the axis, wherein the reinforcement having a fourth length that extends from a first portion of the reinforcement to a second portion of the reinforcement, and
wherein the fourth length of the reinforcement is positioned substantially perpendicular to the third length of the corner radius.

10. The door ring assembly according to claim 1, wherein the reinforcement having a fourth length that extends from a first portion of the reinforcement to a second portion of the reinforcement,
wherein the first portion of the reinforcement is positioned on at least the portion of the corner radius that extends from a vertical section of the body, and
wherein the second portion of the reinforcement is positioned on at least the portion of the corner radius that extends from a first horizontal section of the first leg.

11. The door ring assembly according to claim 1, wherein the corner radius having the axis that extends along a third length from the first extent of the axis to the second extent of the axis,
wherein the reinforcement includes a plurality of reinforcements, each having a fourth length that extends from a first portion of each of the plurality of reinforcements to a second portion of each of the plurality of reinforcements,
wherein each of the plurality of reinforcements of the reinforcement is perpendicularly positioned at a predetermined interval along the third length of the corner radius.

12. The door ring assembly according to claim 1, wherein the body is located at a first plane, and the first leg is located at a second plane, wherein the corner radius is located at an intersection of the first plane and the second plane.

13. The door ring assembly according to claim 1, wherein the frame member is a side sill of a vehicle.

14. The door ring assembly according to claim 1, wherein the frame member has a first thickness and the reinforcement has a second thickness,
wherein the first thickness is greater than the second thickness, and
wherein the first thickness of the frame member is in a range between 1.6 mm to 6 mm and the second thickness of the reinforcement is in a range between 0.2 mm to 1.6 mm.

15. A door ring assembly, comprising:
an A-pillar having an upper portion and a lower portion;
a B-pillar having an upper portion and a lower portion; and
a stamped side sill assembly formed from a blank comprising a reinforcement that is solid-state bonded to the blank, the stamped side sill assembly comprising:
a body having a first length that extends from a first end of the body to a second end of the body, wherein
the first end is secured to the lower portion of the A-Pillar and the second end is secured to the lower portion of the B-Pillar,
the reinforcement is positioned on at least a portion of a corner radius of the body longitudinally along the first length of the body,
the portion of the corner radius is located at a mid-point between a first extent of an axis of the corner radius and a second extent of the axis of the corner radius,
the first extent is at a first starting point of the lower portion of the A-pillar, and
the second extent is at a second starting point of the lower portion of the B-pillar.

16. The door ring assembly according to claim 15, wherein the upper portion of the A-pillar extends along a length of a vehicle to a rearward end of the A-pillar, wherein a roof rail of the vehicle is secured to the rearward end of the upper portion of the A-pillar,
wherein a mating flange is configured to secure the roof rail with the rearward end of the upper portion of the A-pillar, and
wherein the reinforcement is positioned longitudinally along the first length of the body, based on a location of the mating flange secured to the upper portion of the A-pillar.

17. The door ring assembly according to claim 15, wherein the upper portion of the A-pillar extends along a length of a vehicle to a rearward end of the A-pillar, wherein a roof rail of the vehicle is secured to the rearward end of the upper portion of the A-pillar,
wherein a mating flange is configured to secure the roof rail with the rearward end of the upper portion of the A-pillar, and
wherein a second reinforcement is located on at least a portion of the mating flange.

18. The door ring assembly according to claim 15, wherein the reinforcement is positioned on at least a portion of an inner surface or an outer surface of the corner radius of the body, along the first length.

* * * * *